US012699559B2

(12) United States Patent
D'Acosta et al.

(10) Patent No.: US 12,699,559 B2
(45) Date of Patent: Aug. 4, 2026

(54) FIRMWARE VALIDATION FOR POWER DELIVERY SYSTEM USING SIMULATED POWER DELIVERY SYSTEM VALUES

(71) Applicant: Schweitzer Engineering Laboratories, Inc., Pullman, WA (US)

(72) Inventors: Javier Fernando D'Acosta, San Juan Capistrano, CA (US); Lee Melville, Irvine, CA (US); David J. Dolezilek, Pullman, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 280 days.

(21) Appl. No.: 18/394,225

(22) Filed: Dec. 22, 2023

(65) Prior Publication Data

US 2025/0208848 A1 Jun. 26, 2025

(51) Int. Cl.
*G06F 8/65* (2018.01)
*G06F 21/57* (2013.01)

(52) U.S. Cl.
CPC .............. *G06F 8/65* (2013.01); *G06F 21/572* (2013.01); *G06F 2221/033* (2013.01)

(58) Field of Classification Search
CPC .... G06F 8/65; G06F 21/572; G06F 2221/033; G06F 8/60; G06F 8/61; G06F 2221/00; G06F 2111/10; G06F 30/367; G06N 7/06; G06G 1/0036; G06G 3/10
USPC ................................... 717/168; 703/3, 6, 13
See application file for complete search history.

(56) References Cited

U.S. PATENT DOCUMENTS

| | | | |
|---|---|---|---|
| 9,015,837 B1 * | 4/2015 | De Los Reyes .......... | G06F 8/65 717/172 |
| 2019/0258472 A1 * | 8/2019 | Kim ......................... | H04B 5/20 |

OTHER PUBLICATIONS

Rick Bryson, "Using an RTAC to Monitor and Report Firmware and Settings Changes in SEL Relays," SEL Application Guide vol. VII AG2017-15, May 26, 2017.
Brian K. Johnson, Cat Wong, Sal Jadid, "Validation of Transmission Line Relay Parameters Using Synchrophasors," Originally presented at the 68th Annual Georgia Tech Protective Relaying Conference, Apr. 2014.
Henrique Magnago, et al, "Hardware-in-the-Loop Simulation, Control, and Validation of Battery Inverter Characteristics Through the IBR Control Hardware," Presented at the 49th Annual Western Protective Relay Conference, Oct. 2022.

(Continued)

*Primary Examiner* — Bradley A Teets
*Assistant Examiner* — Zengpu Wei
(74) *Attorney, Agent, or Firm* — Fletcher Yoder, P.C.

(57) ABSTRACT

Systems and methods to validating a firmware update of an intelligent electronic device (IED) of an electric power delivery system are provided. A system may include a computing device that communicatively couples to an intelligent electronic device (IED) of an electric power delivery system. The computing device may transmit a signal indicative of instructions to pause normal intelligent electronic device (IED) operation and apply a firmware update and transmit a signal including simulated power delivery system measurements to the intelligent electronic device (IED). The computing device may receive a signal indicative of test results from the intelligent electronic device (IED) and determine validation of the firmware update based on the test results.

20 Claims, 8 Drawing Sheets

(56)  References Cited

OTHER PUBLICATIONS

George Masters and Brian Crites, "Using a Script to Automate Firmware Updates for SEL-3610, SEL-3620, or SEL-3622 Devices," SEL Application Guide vol. II AG2014-17, Feb. 11, 2021.
Mohammed Pithapur and Mark Bosold, "Maintaining IEC 61850 Configuration While Upgrading Firmware in SEL-400 Series Relays," SEL Application Guide vol. II AG2017-36, Nov. 13, 2017.

\* cited by examiner 200, 104, 106, 108, 115, 170, 178, 180

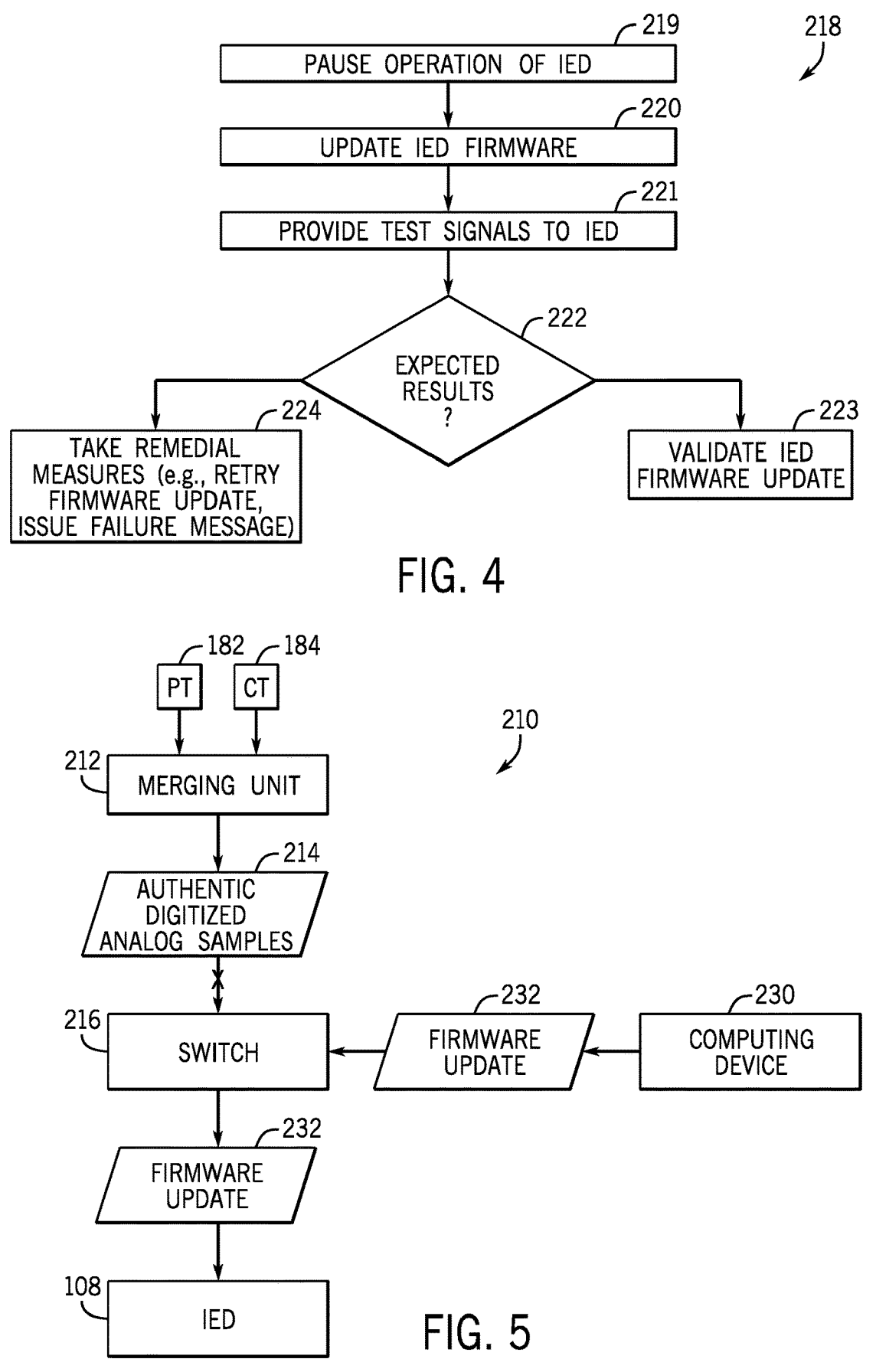

218

219 PAUSE OPERATION OF IED

220 UPDATE IED FIRMWARE

221 PROVIDE TEST SIGNALS TO IED

222 EXPECTED RESULTS ?

224 TAKE REMEDIAL MEASURES (e.g., RETRY FIRMWARE UPDATE, ISSUE FAILURE MESSAGE)

223 VALIDATE IED FIRMWARE UPDATE

212 MERGING UNIT

214 AUTHENTIC DIGITIZED ANALOG SAMPLES

216 SWITCH

232 FIRMWARE UPDATE

230 COMPUTING DEVICE

232 FIRMWARE UPDATE

108 IED

FIG. 5

FIRMWARE VALIDATION FOR POWER DELIVERY SYSTEM USING SIMULATED POWER DELIVERY SYSTEM VALUES

BACKGROUND

This disclosure relates to systems and methods for validating device firmware or configuration changes based on records of device interaction with power system values before and after firmware or configuration changes.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of any kind.

Electric power delivery systems carry electricity from a transmission system to residential communities, factories, industrial areas, and other electricity consumers. An electric power delivery system may include various intelligent electronic devices (IEDs) that may communicate with other devices of the electric power delivery system during operation of the electric power delivery system. For example, an IED may receive and/or transmit a signal and/or data in order to perform a control function, such as to control a circuit breaker in response to electrical measurements of the electric power distribution system. In some cases, updates to these devices may be performed and validated on-site by a technician, but this process is difficult and time consuming when devices are numerous or remote.

BRIEF DESCRIPTION OF THE DRAWINGS

FIG. 4 is a flowchart of a method for updating firmware of the IED and testing the firmware using simulated measurements;

FIG. 5 is a block diagram illustrating an operation to update the firmware of the IED;

DETAILED DESCRIPTION

Figure 1:
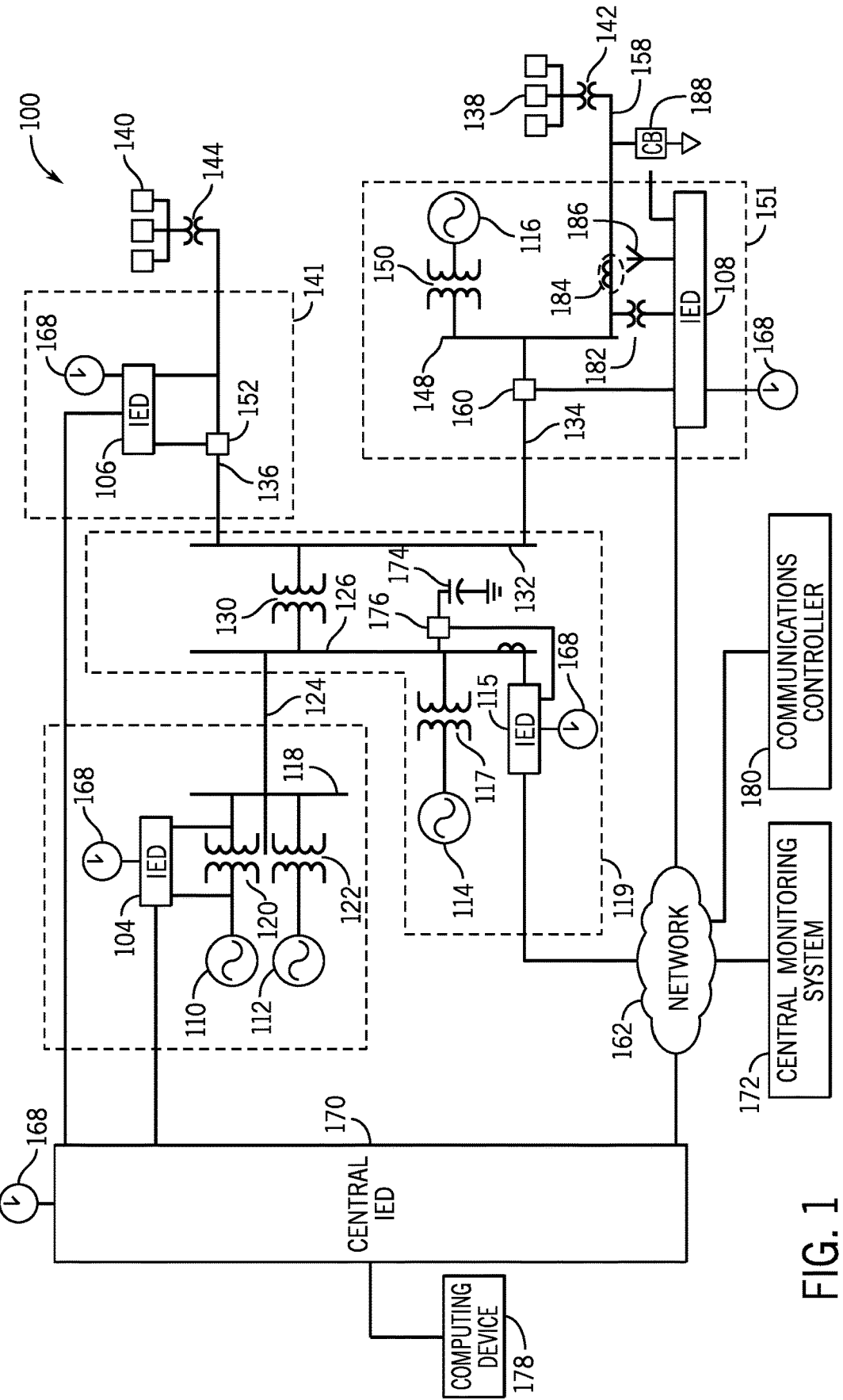
FIG. 1 is a schematic diagram of an electric power delivery system.

Turning to the drawings, FIG. 1 is a schematic diagram of an electric power distribution system 100 that may generate, transmit, and/or distribute electric energy to various loads (e.g., different structures). The electric power distribution system 100 may use various IEDs 104, 106, 108, 115 to control certain aspects of the electric power distribution system 100. As used herein, an IED (e.g., the IEDs 104, 106, 108, 115) may refer to any processing-based device that monitors, controls, automates, and/or protects monitored equipment within the electric power distribution system 100. Although the present disclosure primarily discusses the IEDs 104, 106, 108, 115 as relays, such as a remote terminal unit, a differential relay, a distance relay, a directional relay, a feeder relay, an overcurrent relay, a voltage regulator control, a voltage relay, a breaker failure relay, a generator relay, and/or a motor relay, additional IEDs 104, 106, 108, 115 may include an automation controller, a bay controller, a meter, a recloser control, a communications processor, a computing platform, a programmable logic controller (PLC), a programmable automation controller, an input and output module, and the like. Moreover, the term IED may be used to describe an individual IED or a system including multiple IEDs.

For example, the electric power distribution system 100 may be monitored, controlled, automated, and/or protected using the IEDs 104, 106, 108, 115, and a central monitoring system 172 (e.g., an industrial control system). In general, the IEDs 104, 106, 108, 115 may be used for protection, control, automation, and/or monitoring of equipment in the electric power distribution system 100. For example, the IEDs 104, 106, 108, 115 may be used to monitor equipment of many types, including electric power lines, current sensors, busses, switches, circuit breakers, reclosers, transformers, autotransformers, tap changers, voltage regulators, capacitor banks, generators, motors, pumps, compressors, valves, and a variety of other suitable types of monitored equipment.

A common time signal may be distributed throughout the electric power distribution system 100. Utilizing a common time source may ensure that IEDs 104, 106, 108, 115 have a synchronized time signal that can be used to generate time synchronized data, such as synchrophasors. In various embodiments, the IEDs 104, 106, 108, 115 may receive a common time signal 168. The time signal may be distributed in the electric power distribution system 100 using a communications network 162 and/or using a common time source, such as a Global Navigation Satellite System ("GNSS"), or the like.

The IEDs 104, 106, 108, 115 may be used for controlling various other equipment of the electric power distribution system 100. By way of example, the illustrated electric power distribution system 100 includes electric generators 110, 112, 114, 116 and power transformers 117, 120, 122, 130, 142, 144, 150. The electric power distribution system 100 may also include electric power lines 124, 134, 136, 158 and/or busses 118, 126, 132, 148 to transmit and/or deliver power, circuit breakers 152, 160, 176 to control flow of power in the electric power distribution system 100, and/or loads 138, 140 to receive the power in and/or from the electric power distribution system 100. A variety of other types of equipment may also be included in electric power distribution system 100, such as a voltage regulator, a capacitor (e.g., a capacitor 174), a potential transformer (e.g., a potential transformer 182), a current sensor (e.g., a wireless current sensor (WCS) 184), an antenna (e.g., an antenna 186), a capacitor banks (e.g., a capacitor bank (CB) 188), and other suitable types of equipment useful in power generation, transmission, and/or distribution.

A substation 119 may include the electric generator 114, which may be a distributed generator and which may be connected to the bus 126 through the power transformer 117 (e.g., a step-up transformer). The bus 126 may be connected to the distribution bus 132 via the power transformer 130 (e.g., a step-down transformer). Various electric power lines 136, 134 may be connected to the distribution bus 132. The electric power line 136 may lead to a substation 141 in which the electric power line 136 is monitored and/or controlled using the IED 106, which may selectively open and close the circuit breaker 152. The load 140 may be fed from the electric power line 136, and the power transformer 144 (e.g., a step-down transformer) in communication with the distribution bus 132 via electric power line 136 may be used to step down a voltage for consumption by the load 140.

The electric power line 134 may deliver electric power to the bus 148 of the substation 151. The bus 148 may also receive electric power from the distributed electric generator 116 via the power transformer 150. The electric power line 158 may deliver electric power from the bus 148 to the load 138 and may include the power transformer 142 (e.g., a step-down transformer). The circuit breaker 160 may be used to selectively connect the bus 148 to the electric power line 134. The IED 108 may be used to monitor and/or control the circuit breaker 160 as well as the electric power line 158.

According to various embodiments, the central monitoring system 172 may include one or more of a variety of types of systems. For example, the central monitoring system 172 may include a supervisory control and data acquisition (SCADA) system and/or a wide area control and situational awareness (WACSA) system. A central IED 170 may be in communication with the IEDs 104, 106, 108, 115. The IEDs 104, 106, 108, 115 may be remote from the central IED 170 and may communicate over various media. For instance, the central IED 170 may be directly in communication with the IEDs 104, 106 and may be in communication with the IEDs 108, 115 via the communications network 162.

The central IED 170 may enable or block data flow between any of the IEDs 104, 106, 108, 115. For example, during operation of the electric power distribution system 100, the IEDs 104, 106, 108, 115 may transmit data with one another to perform various functionalities for the electric power distribution system 100 by initially transmitting the data to the central IED 170. The central IED 170 may receive the data and may subsequently transmit the data to an intended recipient of the data. The central IED 170 may also control data flow between one of the IEDs 104, 106, 108, 115 and another device communicatively coupled to the central IED 170, such as a computing device 178. For instance, the computing device 178 may be a laptop, a mobile phone, a desktop, a tablet, or another suitable device with which a user (e.g., a technician, an operator) may interact. As such, the user may utilize the computing device 178 to receive data, such as operating data, from the electric power distribution system 100 via the central IED 170 and/or to send data, such as a user input, to the electric power distribution system 100 via the central IED 170. Thus, the central IED 170 may enable or block operation of the electric power distribution system 100 via the computing device 178.

A communications controller 180 may interface with equipment in the communications network 162 to create an SDN that facilitates communication between the central IED

170, the IEDs 104, 106, 108, 115, and/or the central monitoring system 172. In various embodiments, the communications controller 180 may interface with a control plane (not shown) in the communications network 162. Using the control plane, the communications controller 180 may direct the flow of data within the communications network 162. Indeed, the communications controller 180 may communicate with the central IED 170 to instruct the central IED 170 to transmit certain data (e.g., data associated with a certain set of characteristics or information) to a particular destination (e.g., an intended recipient) using flows, matches, and actions defined by the communications controller 180.

It may be desirable to adjust (e.g., update) the firmware of the central IED 170 and/or the IEDs 104, 106, 108, 115, and validate that the adjusted firmware works properly. For example, it may be desirable to adjust a variable or property of an IED to change how the IED performs a control function. Thus, embodiments of the present disclosure are directed to simplifying the manner in which the configuration of an IED may be adjusted and validated.

Figure 2:
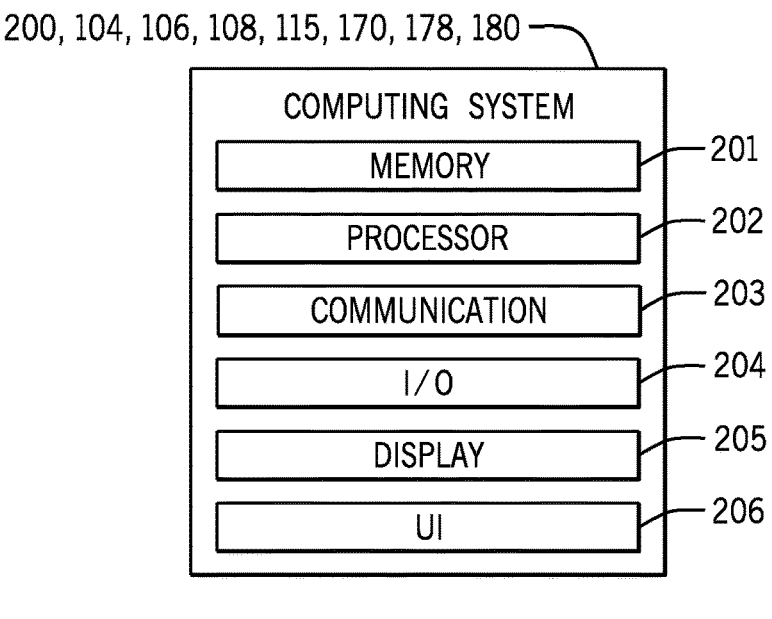
FIG. 2 is a block diagram of a computing system of the electric power delivery system.

FIG. 2 is a schematic diagram of an example of a computing system 200 that may be incorporated within a device of the electric power distribution system 100, such as in any of the IEDs 104, 106, 108, 115, the central IED 170, the computing device 178, and/or the communications controller or key device or 180. The computing system 200 may include a memory 201 and a processor or processing circuitry (e.g., data processing circuitry) 202. The memory 201 may include a non-transitory computer-readable medium that may store instructions that, when executed by the processor 202, may cause the processor 202 to perform various methods and/or operations described herein. To this end, the processor 202 may be any suitable type of computer processor or microprocessor capable of executing computer-executable code, including but not limited to one or more field programmable gate arrays (FPGA), application-specific integrated circuits (ASIC), programmable logic devices (PLD), programmable logic arrays (PLA), and the like. The processor 202 may include a single processor core or multiple processor cores.

The computing system 200 may also include a communication system 203, which may include a wireless and/or wired communication device to establish a secure communication link with another device of the electric power distribution system 100. That is, the communication system 203 enables the computing system 200 (e.g., of one of the IEDs 104, 106, 108, 115) to communication with another communication system 203 of another computing system 200 (e.g., of the central IED 170), such as via MACsec. Indeed, the communication system 203 may include any suitable communication circuitry for communication via a personal area network (PAN), such as Bluetooth or ZigBee, a local area network (LAN) or wireless local area network (WLAN), such as an 802.11x Wi-Fi network, and/or a wide area network (WAN), (e.g., third-generation (3G) cellular, fourth-generation (4G) cellular, near-field communications technology, universal mobile telecommunication system (UMTS), long term evolution (LTE), long term evolution license assisted access (LTE-LAA), fifth-generation (5G) cellular, and/or 5G New Radio (5G NR) cellular). The communication system 203 may also include a network interface to enable communication via various protocols such as EtherNet/IP®, ControlNet®, DeviceNet®, or any other suitable industrial communication network protocol.

Additionally, the computing system 200 may include input/output (I/O) ports 204 that may be used for communicatively coupling the computing system 200 to an external device. For example, the I/O ports 204 of the computing system 200 of the central IED 170 may communicatively couple to corresponding I/O ports 204 of the computing system 200 of the computing device 178. The computing system 200 may further include a display 205 that may present any suitable image data or visualization. Indeed, the display 205 may present image data that includes various information regarding the electric power distribution system 100, thereby enabling the user to observe an operation, a status, a parameter, other suitable information, or any combination thereof, of the electric power distribution system 100. Further still, the computing system 200 may include a user interface (UI) 206 with which the user may interact to control an operation of the computing system 200. For instance, the UI 206 may include a touch screen (e.g., as a part of the display 205), an eye-tracking sensor, a gesture (e.g., hand) tracking sensor, a joystick or physical controller, a button, a knob, a switch, a dial, a trackpad, a mouse, another component, or any combination thereof. As an example, the user may utilize the UI 206 of the computing system 200 of the computing device 178 to transmit data to the central IED 170.

Figure 3:
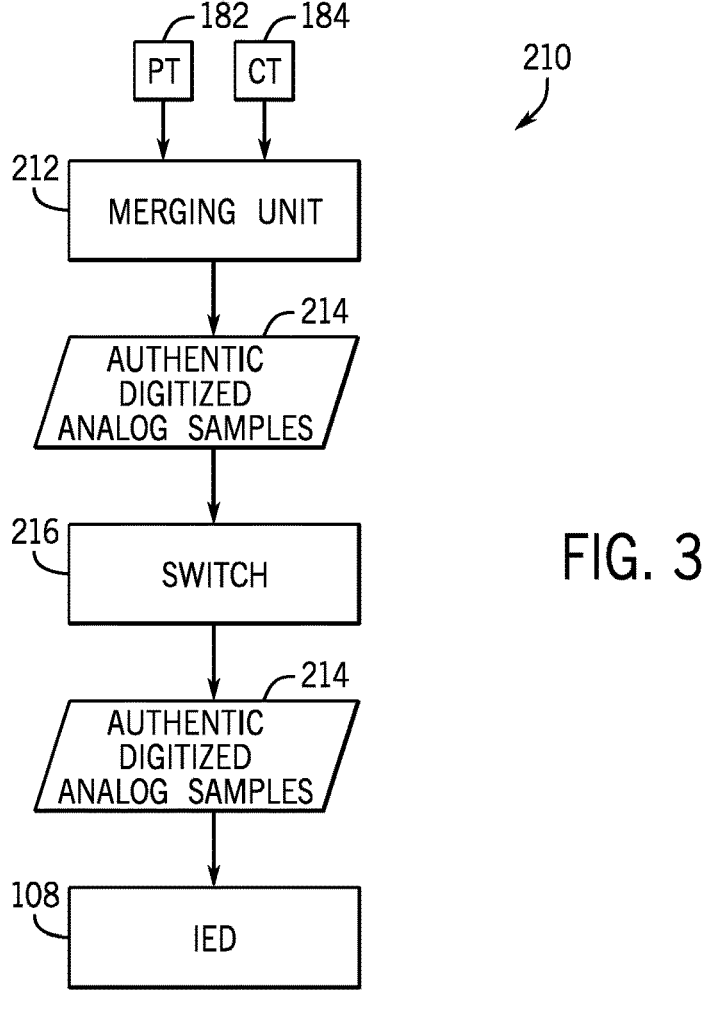
FIG. 3 is a block diagram illustrating an operation to obtain electrical measurements and provide the measurements to an intelligent electronic device (IED) of the electric power delivery system.

FIG. 3 is a schematic block diagram illustrating a system 210 in which electric authentic power delivery system values are digitized within an IED 108 or digitized in a merging unit 212 and sent to an IED 108. A potential transformer 182 and a current transformer 184 may be connected to an electrical power line of an electric power delivery system to monitor power system values (e.g., current, voltage, etc.) of the electric power delivery system. The potential transformer 182 and current transformer 184 may convert (e.g., reduce, scale, or otherwise alter) the power system values to a range determined to be interpretable by a merging unit 212 and/or an IED 108. In the illustrated example, the potential transformer 182 and the current transformer 184 transmit power system values to the merging unit 212. The merging unit 212 digitizes the power system values and transmit them as authentic digitized analog samples 214 to the IED 108 through a switch 216. The switch 216 may communicatively couple and decouple the merging unit 212 and IED 108 (e.g., switch between the merging unit 212 and open circuit as input to the IED 108).

In some examples, an IED 109 may be directly coupled to the potential transformer 182 and the current transformer 184. As such, the potential transformer 182 and the current transformer 184 may transmit the power system values directly to the IED 109, and the IED 109 may digitize the power system values. Additionally, a switch (e.g., the switch 216) may communicatively couple and decouple the potential transformer 182, the current transformer 184, and the IED 109. Further, the techniques described herein may be used to validate electric power delivery system firmware of the merging unit 212, the IED 108, or both.

FIG. 4 is a flowchart for a method 218 for validating electric power delivery system firmware using simulated power delivery system values. In process block 219, normal operation of the IED is paused. Normal operation of the IED may include, for example, creating digitized power system values from local connections to the field or receiving digital power system values from a merging unit and controlling one or more components of the electrical delivery system, such as a circuit breaker, based on the digitized system values. Process block 219 may also include IED decoupling from digitization of field signals or decoupling from the message subscriptions from the merging unit and coupling the IED to other circuitry or simulated digital message streams, being produced by a test or computing device. In process block 220, IED firmware is updated using a computing device that may be communicatively coupled to the IED via electrical connection, local area network, wide area network, and so on. In process block 221, testing signals are sent from the computing device to the IED as, for example, a digital message stream of simulated signals rather than digitized analog values sent from the merging unit. The testing signals may include, for example, simulated digitized analog samples of the power delivery system, as described herein. In an example, the simulated digitized analog samples are generated and sent to field contacts of the IED via a test device. The IED then computes simulated digital measurements using the simulated digitized analog samples which are retrieved by the computing device. In query block 222, the received test results are compared to expected test results. If the test results are within a specified or determined range of the expected results, in process block 223, the IED firmware update is validated. If, however, the test results are not within some specified range of the expected results, in process block 224, remedial measures are taken.

FIG. 5 is a schematic diagram illustrating the system 210, in which operation of the IED 108 is paused and firmware of the IED 108 is updated. The system 210 may perform or be used in conjunction with process blocks 219 and 220 of the method 218. In the illustrated embodiment, transmission of digitized authentic digitized analog samples (e.g., power system measurements) 214 from the merging unit 212 is paused or decoupled from IED 108. In some embodiments, the switch 216 decouples the IED 108 from the merging unit 212, allowing a pause of transmission while obviating the need for intervention at the merging unit 212, the IED 108, the potential transformer 182, or the current transformer 184, such as manual input of test measurements to the merging unit 212.

In the illustrated example, the switch 216 is coupled to a computing device 230, allowing a communicative connection between the computing device 230 and the IED 108 through the switch 216. Prior to or as part of a firmware update, a signal is sent from the computing device 230 to the switch 216 indicative of instructions to switch from a connection to the merging unit 212 to a connection to the computing device 230. Upon execution of these instructions by the switch 216, the computing device 230 is communicatively coupled to the IED 108 via the switch 216, such that digital data can be exchanged between the IED 108 and the computing device 230.

In other embodiments, one or more switches 216 may couple a merging unit to multiple IEDs 108 and a computing device 230 (e.g., having circuitry of the computing system 200), such that instructions executed by the switches 216 selectively connect and disconnect the multiple IEDs 108 and the computing device 230. Thus, one computing device 230 may complete firmware updates and validation testing of multiple IEDs 108. This reduces or eliminates the use of multiple computing devices to complete the firmware updates and testing of multiple relays located within the same substation, for example.

In another example, the computing device 230 may use a software-defined-networking (SDN) technology to manage the communicative connections between merging units 212, IEDs 108, and computing devices 230. The SDN data flow rules may control the flow of data, including firmware updates, simulated measurements, and test results between merging units 212, IEDs 108, and computing devices 230. The parameters of the SDN configuration may be adjusted by an operator remotely or on-site at the computing device 230 (e.g., via the UI of the computing device 230). Further, the SDN data flow rules managed by the computing device 230 may control the flow of data for a specified or determined time. For example, the SDN may allow (e.g., turn on) data flow from the computing device to the IED 108 during firmware update and validation testing, and pause (e.g., turn off) data flow from the computing device 230 to the IED 108 to resume normal electric power delivery system operation.

With authentic power signal message transfer between the merging unit 212 and the IED 108 paused and communication between the computing device 230 and the IED 108 established, a firmware update 232 is sent via the switch 216 to the IED 108 as firmware update 232. In some examples, the IED 108 may receive the firmware update 232 from a computing device other than the computing device 230. The firmware update 232 may include a data signal indicative of instructions to be stored (e.g., downloaded) in the memory and executed by the processor of the IED 108. The firmware or messages from a computing device may include instructions such as, for example, security (e.g., cybersecurity) configuration changes, measurement changes, user validation configuration changes, control function changes, and so forth. The instructions may also include instructions to enter an update mode or test mode, in which the IED 108 receives inputs and generates test results indicative of the functional outputs the IED 108 outputs during normal operation. For example, the IED 108 may provide an indication of behavior in response to input without transmitting an output capable of functional operation (e.g., tripping a circuit breaker), so that the behavior of the IED 108 during firmware update and validation testing does not impact the electric power delivery system the IED 108 is connected to and/or part of. Upon completion of the IED firmware update, the IED 108 may send an indication to the computing device that the firmware update is complete.

FIG. 6 is a schematic diagram of the system 210, in which the computing device 230 sends simulated digitized analog samples 240 to the IED 108 via the switch 216, the IED 108 is configured to send simulated digital measurements 242 to the computing device 230 via the switch 216, and the computing device 230 is configured to validate the simulated digital measurements 242. The illustrated system 210 may be part of, or used in conjunction with, process block 221, query block 222, and process blocks 224 and 223 of the method 218 described above. The simulated digitized analog samples 240 may be stored as data in the memory of the computing device 230 prior to transmission to the IED 108. Further, the simulated digitized analog samples 240 include digital data that may have similar qualities to the authentic digital data generated by a merging unit (e.g., merging unit 212.) Thus, the behavior of the IED 108 in response to simulated digitized analog samples 240 may be indicative of the behavior of the IED 108 in response to authentic digitized analog samples 214 (e.g., during normal operation.)

In response to receiving the simulated digitized analog samples 240, the IED 108 may generate and transmit simulated digital measurements 242. Alternately, the test results may be retrieved by a computing device. As mentioned previously, the simulated digital measurements 242 may be merely indicative of simulated behavior; thus, no tangible control function (e.g., tripping a circuit breaker) may be actually performed. The simulated digital measurements 242 may include, for example, values and/or measurements received by the IED 108 prior to performing a control function, control functions performed by the IED 108 based on the received measurements, measurements received by the 108 after a control function is performed, time between measurements, and so forth. For example, the computing device 230 may send simulated digitized analog samples 240 indicative of an overcurrent event in the electric power delivery system associated with the IED 108. In response, the IED 108 records a current value associated with the simulated digitized analog samples 240, records a current value during the simulated circuit breaker trip, and records a simulated current value after the simulated circuit breaker trip is completed. The values recorded by the IED 108 throughout the simulation may then be compiled into an event report and sent as simulated digital measurements 242 to, or retrieved by, the computing device 230 via the switch 216.

In response to receiving the simulated digital measurements 242, the computing device 230 may determine if the firmware update of the IED 108 is validated. In the illustrated example, the computing device 230 determines the validation of the IED firmware update by comparing received simulated digital measurements 242 to expected digital measurements. The expected digital measurements may correspond to expected test results of a normally functioning IED when the normally functioning IED receives the simulated digitized analog samples 240, and they may be stored as data in the memory of the computing device 230. For example, if the simulated digitized analog samples 240 represent an overcurrent event, the expected results may represent the behavior (e.g., the current recordings) of a normally functioning IED in response to an overcurrent event.

If the values including the simulated digital measurements 242 are within a determined or specified validation range (e.g., threshold) of the values including the expected digital measurements, the IED firmware update is validated. The validation range may be determined based on, for example, the type of result (e.g., current measurement, voltage measurement, time value, etc.) and/or a percentage of the expected results (e.g., 1%, 5%, 10%, 20%). In response to validation of the IED firmware update, the computing device 230 may present a message 244 to the operator of the computing device 230 via the display of the computing device 230 confirming that the IED firmware update is validated.

If, however, the values including the simulated digital measurements 242 are not within the determined or specified validation range of the values including the expected results, the IED firmware is invalidated. In response, the computing device 230 may execute remedial measures. Remedial measures include, for example, sending a signal to the IED 108 indicative of instructions to restart the firmware update process or revert to a prior firmware configuration. Remedial measures may also include displaying a message to the display of the computing device 230 indicating that IED firmware update validation failed. In some embodiments, the computing device 230 may execute remedial measures based in part by operator input. For example, a message may be presented to the operator of the computing device including a notification that firmware update validation failed. The operator may then select an option, via the UI of the computing device 230, to restart the IED 108 firmware update process. The computing device 230 then sends a signal to the IED 108 indicative of instructions to restart the firmware update process. Other remedial actions may include sending an alarm to trigger corrective action and sending commands to IEDs to change primary, dual primary, and backup protection status in order to compensate for the degraded state of the IED which received the firmware update.

Figure 6A:
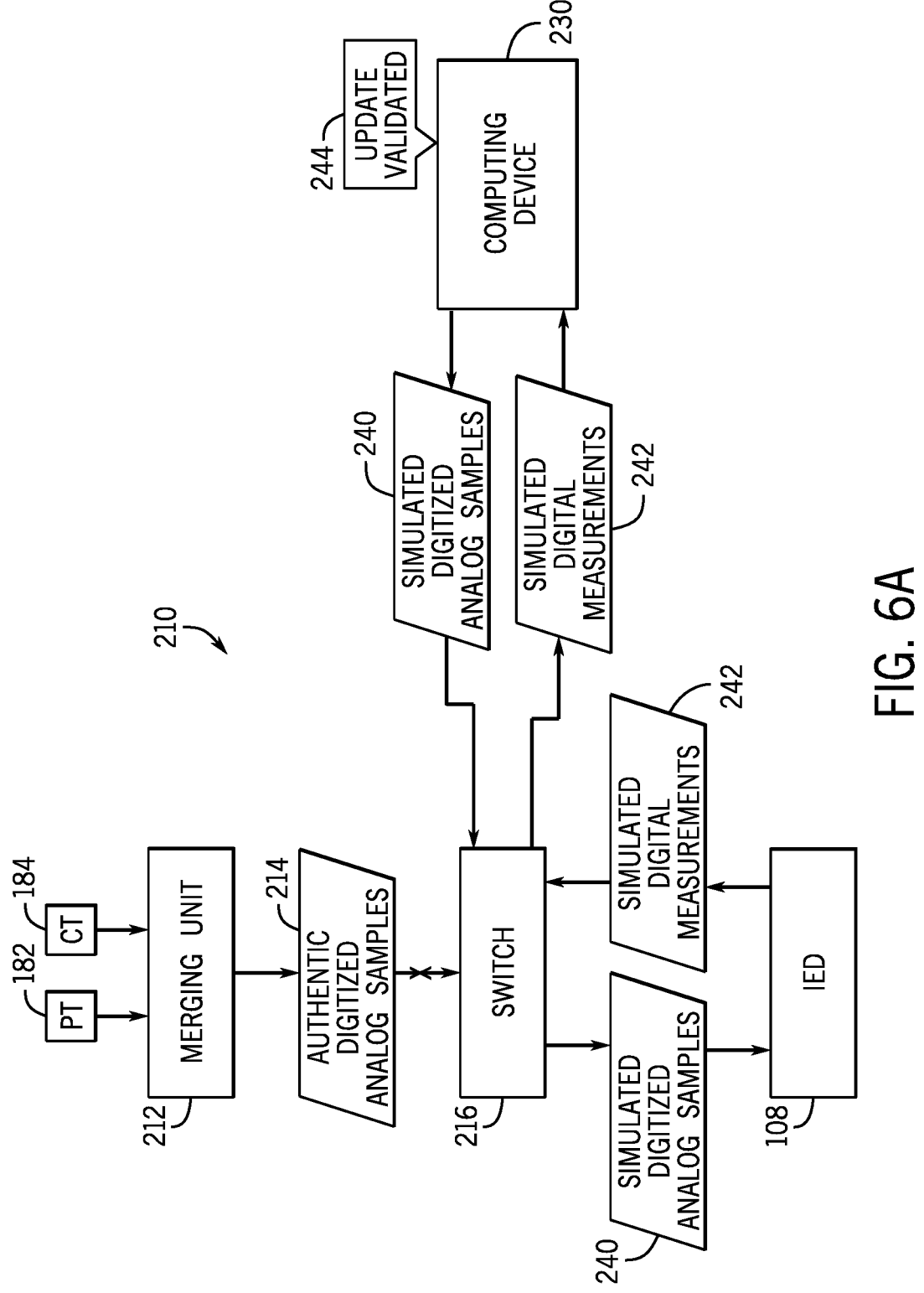
FIG. 6A is a block diagram illustrating an operation to test the updated firmware of the IED using simulated measurements.
Figure 6B:
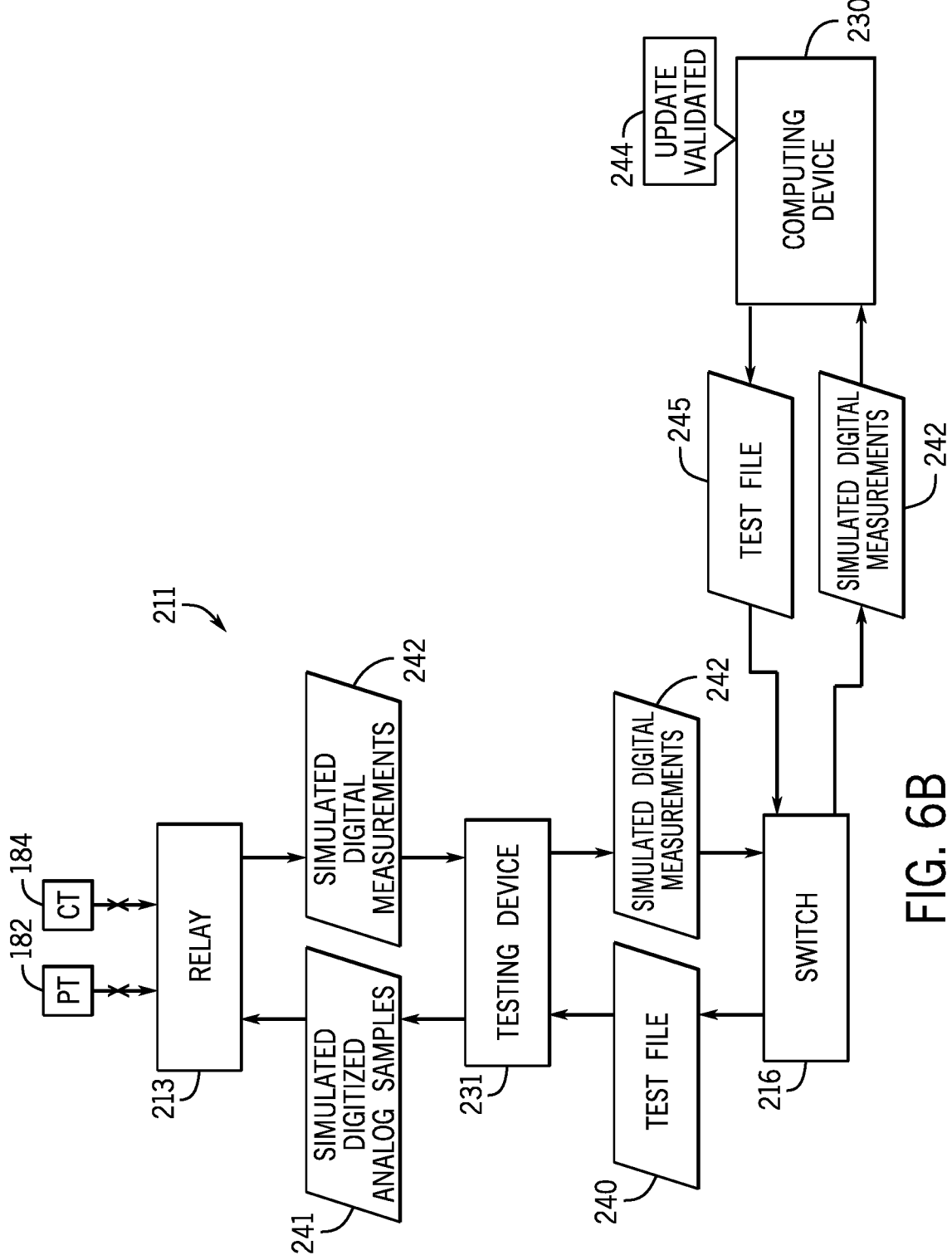
FIG. 6B is a block diagram illustrating an operation to test the updated firmware of the IED using simulated measurements generated by a testing device.

FIG. 6B is a schematic diagram of a system 211, in which the computing device 230 sends a test file to a testing device 231 via the switch 216, the testing device 231 generates simulated digitized analog samples 241 and sends the simulated digitized analog samples 241 to a relay 213. The relay 213 then generates simulated digital measurements 242 and sends the simulated digital measurements 242 to the testing device 231. and the testing device 231 forwards the simulated digital measurements 242 to the computing device 230 via the switch 216. The intelligent merging unit may include a relay or intelligent relay, and the relay 213 may generate actual authentic measurements based on power system values from the potential transformer 182 and/or the current transformer 184. Additionally, the relay 213 may generate simulated digital measurements 242 based on simulated digitized analog samples 241. It should be noted that the system 211 is illustrated individually for presentation purposes, but may be used as part of, or in conjunction with, the system 210 of FIG. 6A. For example, the merging unit 212 of FIG. 6A may include the relay 213 of FIG. 6B, and the switch 216 may be communicate with the IED 108 of the system 210, the merging unit 212 of the system 210, the relay 213, the computing device 230, and/or the testing device 231, as illustrated in FIG. 6A or FIG. 6B.

In the illustrated example, the computing device 230 sends a test file 245 to the testing device 231 via the switch 216. The test file 245 may include, for example, instructions that are readable by the testing device 231, and the testing device 231 may generate simulated digitized analog samples 241 based on the instructions. The simulated digitized analog samples 241 include analog signals that may have similar qualities to the authentic analog signals generated by a current transformer and/or a potential transformer (e.g., the potential transformer 182 and/or the current transformer 184). For example, the simulated digitized analog samples may include analog current values or analog voltage values representative of power system values during nominal or anomalous power system conditions. In other examples, the simulated digitized analog samples may include digital values representative of power system values during nominal or anomalous conditions sent to devices that process digital signals rather than analog signals as in FIG. 6c. Thus, the behavior of the relay 213 in response to simulated digitized analog samples 241 may be indicative of the behavior of the relay 213 in response to authentic analog data (e.g., during normal operation.)

In response to receiving the simulated digitized analog samples 241, the relay 213 may generate simulated digital measurements 242 and send the simulated digital measurements 242 to the testing device 231. The testing device 231 may then automatically analyze the simulated digital measurements 242 (e.g., compare the simulated digital measurements 242 to expected results) to validate a firmware update and/or present the test results to an operator for manual analysis. Additionally, or alternatively, the testing device 231 may send the simulated digital measurements 242 to the computing device 230 via the switch 216, and the computing device 230 may then validate the update. The computing device 230 may then present a notification 244 to an operator of the computing device indicative of the validation, as described herein.

Figure 6C:
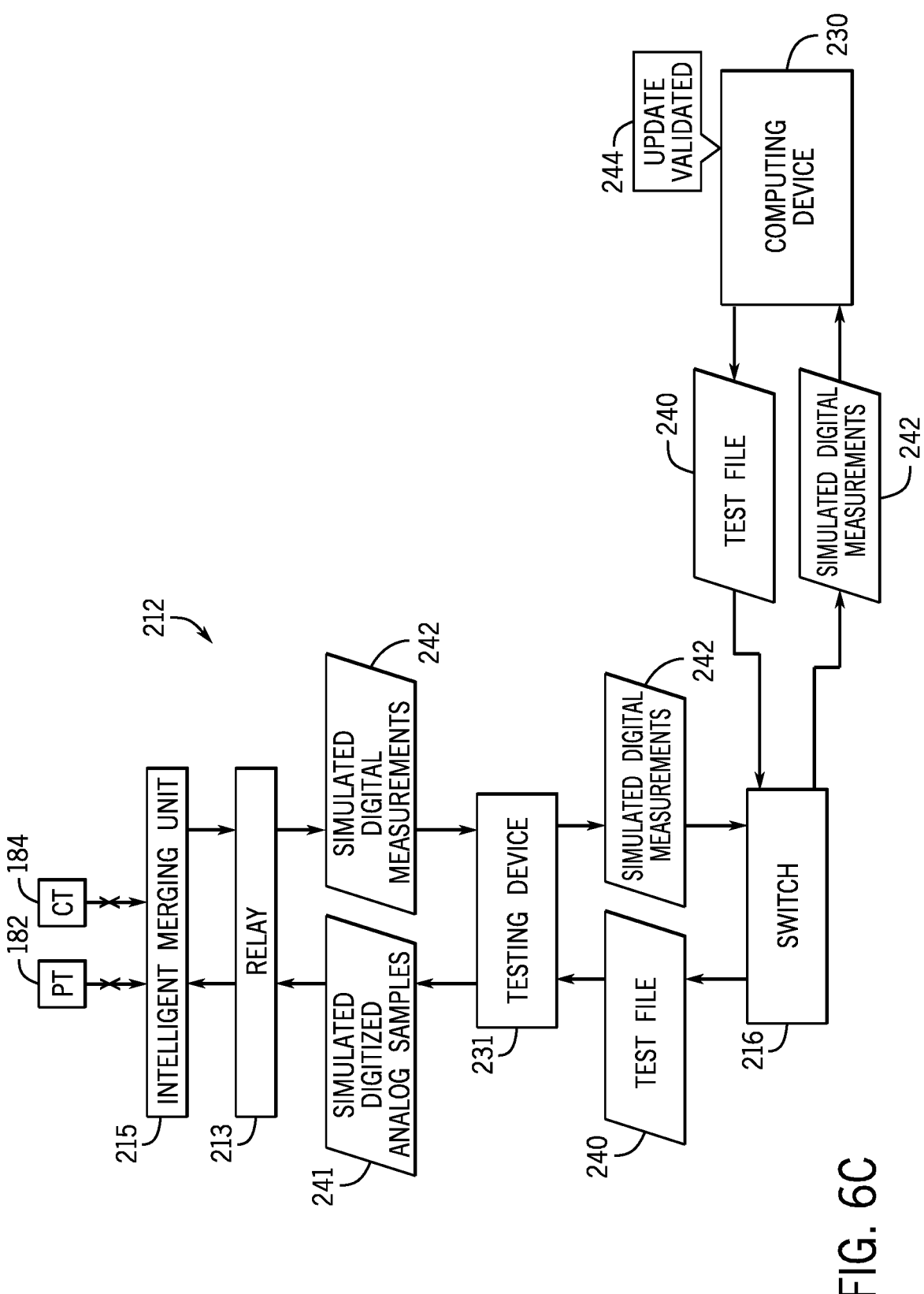
FIG. 6C is a block diagram illustrating an operation to test the updated firmware of an intelligent merging unit and/or relay using simulated measurements generated by a testing device.

FIG. 6C is a schematic diagram of a system 212, in which an intelligent merging unit 215 is used to interface between the relay 213, the potential transformer 182, and the current transformer 184. The intelligent merging unit 215 may facilitate functions of a merging unit (e.g., the merging unit 212 of FIG. 6A), along with additional protection and computation capabilities. In addition, the intelligent merging unit 212 may have firmware or configurations that may be updated and validated described by the method 218 (e.g., similarly to an IED, as described herein). As with the system 211 of FIG. 6B, in the system 212, the computing device 230 sends a test file to a testing device 231 via the switch 216, the testing device 231 generates simulated digitized analog samples 241 and sends the simulated digitized analog samples 241 to a relay 213. The relay 213 may generate simulated digital measurements 242.

As with the system 211 of FIG. 6B, in the system 212, the computing device 230 sends a test file to a testing device 231 via the switch 216, the testing device 231 generates simulated digitized analog samples 241 and sends the simulated measurements 241 to an intelligent merging unit 215. The intelligent merging unit 215 may then interface with the relay 213 for example, exchanging the simulated digitized analog samples 241, and the intelligent merging unit 215 and/or the relay 213 may generate simulated digital measurements 242. The relay 213 may send the simulated digital measurements 242 to the testing device 231, and the testing device 231 may then automatically analyze the simulated digital measurements 242 (e.g., compare the simulated digital measurements 242 to expected results) to validate a firmware update of the relay 213 and/or the intelligent merging unit 215 and/or present the test results to an operator for manual analysis.

Figure 7:
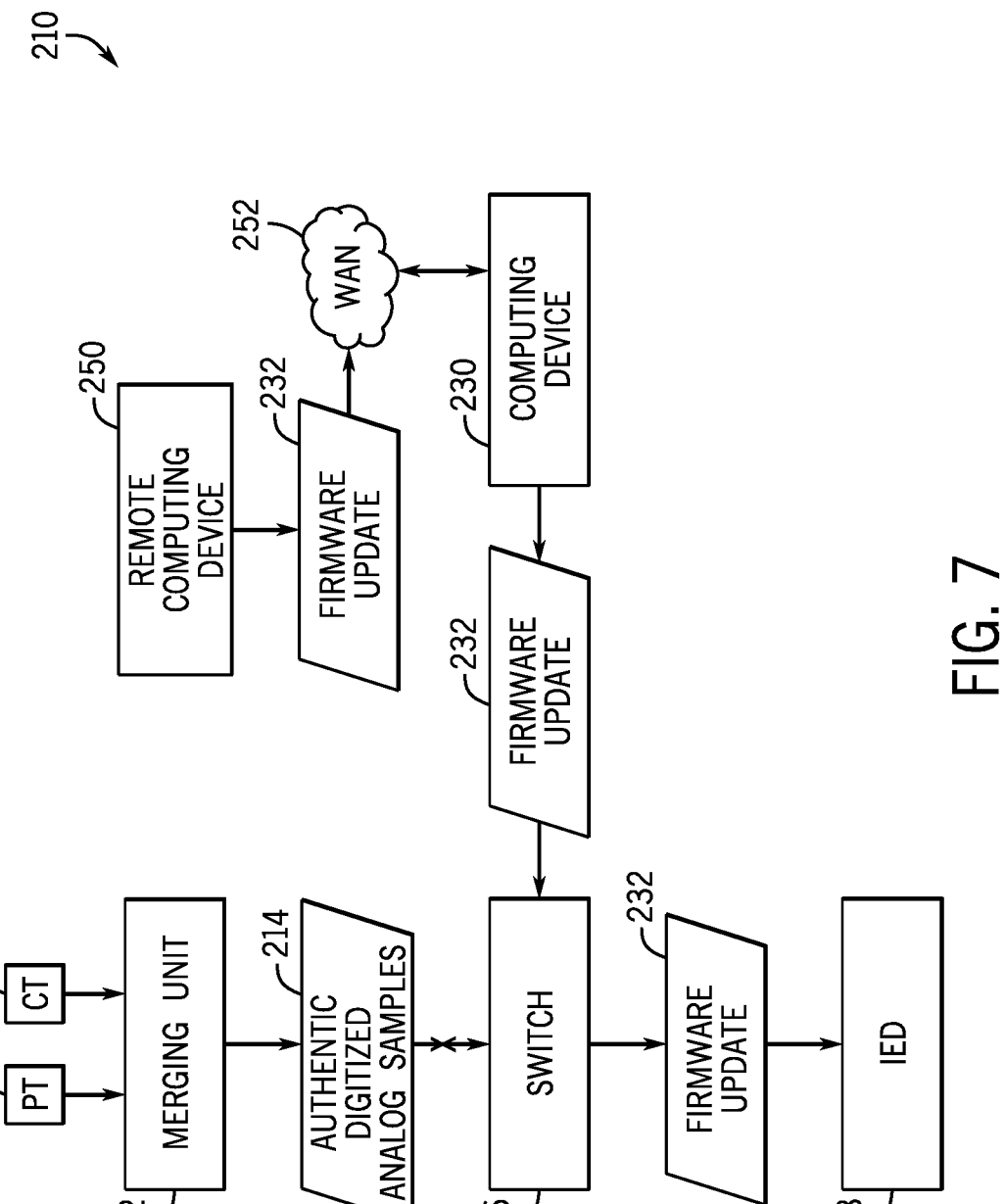
FIG. 7 is a block diagram illustrating an operation to remotely update the firmware of the IED via a wide area network (WAN)

FIG. 7 is a schematic diagram of the system 210, in which a remote computing device 250 is configured to initiate (e.g., prompt) a firmware update of the IED 108 via wide-area network (WAN) 252 and computing device 230. In one particular example, the computing device 230 may store multiple firmware updates in memory. Each of the multiple firmware updates may have varying configuration changes. The remote computing device 250 may accept operator input, via UI input or other input mechanism, to select a firmware update 232 of the multiple firmware updates. In other examples, a firmware update may be selected by an automatic process, such as a scheduled maintenance process. In either case, the remote computing device 250 may send a signal 232 via WAN 252 to the computing device 230 indicative of instructions to update the IED 108 using the selected firmware update 232. In response, the computing device 230 may send a signal indicative of the firmware update 232 to the IED 108 via the switch 216, as described in process blocks 219 and 220 of the method 218 of FIG. 4. As such, the methods described herein for IED firmware validation may be performed by a computing device that is separated (e.g., remote) from an IED via, for example, wide area network.

A firmware update of the multiple firmware updates stored in the memory of the computing device 230 may be selected based on a desired IED configuration change(s). For example, the computing device may store a first firmware update that changes a security configuration of the IED 108 and a second firmware update that changes a control function configuration of the IED 108. If an operator of the remote computing device 250 selects the first firmware update, the remote computing device 250 sends a signal 232 via WAN 252 indicative of instructions to update the IED 108 using the first firmware update. Likewise, if the operator selects the second firmware update, the remote computing device 250 sends a signal 232 via WAN 252 indicative of instructions to update the IED 108 using the second firmware update. Indeed, by selecting a firmware update stored locally on the computing device 230, IED firmware updates may be initiated remotely without the need for transmission of the firmware update contents over WAN 252 or other communication networks. Thus, the contents of firmware update 232 may be protected from security threats to WAN 252. Further, commands sent from the remote computing device 250 to the computing device 230 via WAN 252 may be protected using any suitable form of encryption (e.g., MACsec, AES, DES, etc.).

Figure 8:
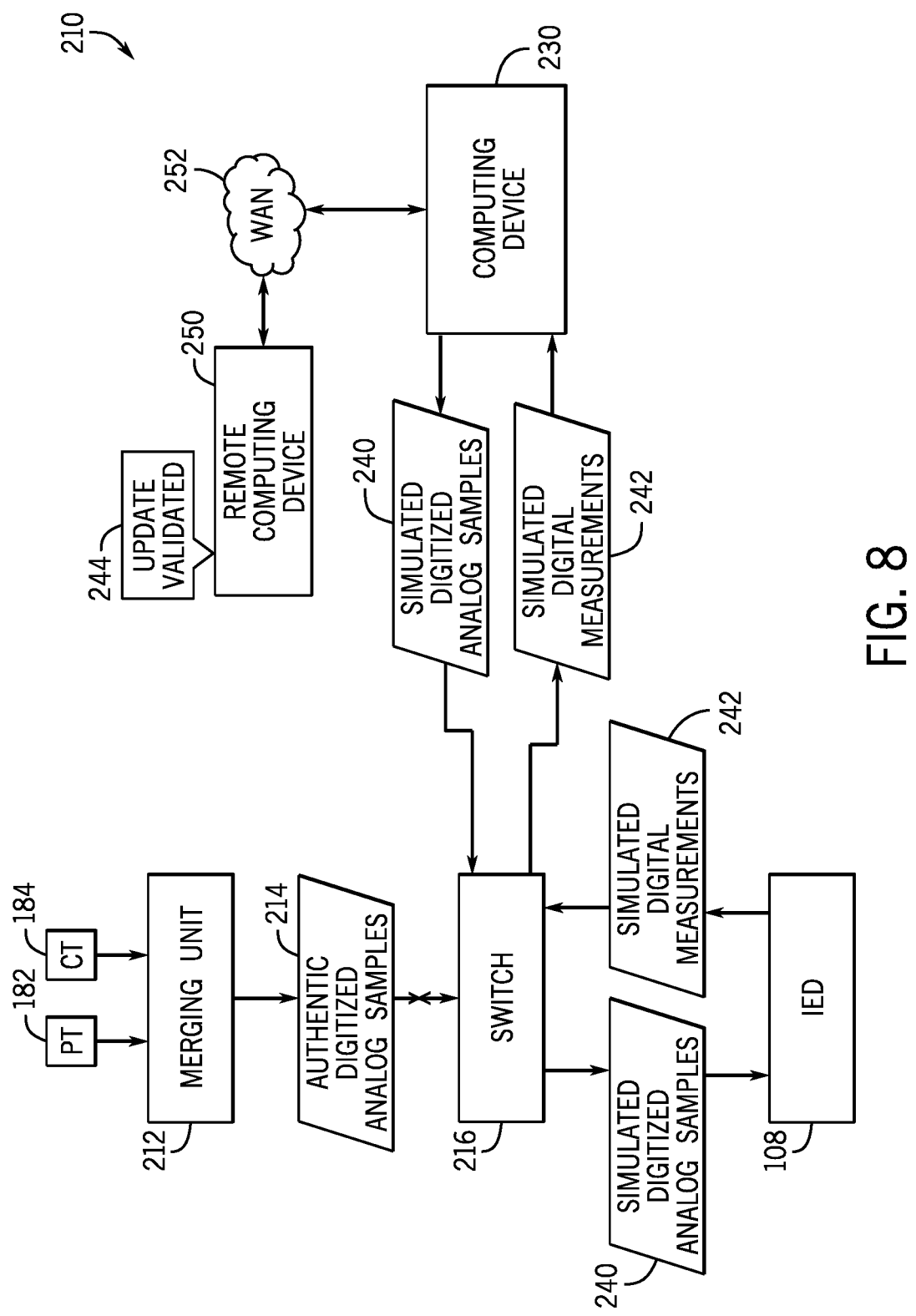
FIG. 8 is a block diagram illustrating an operation to remotely test the updated firmware of the IED using simulated measurements provided via a wide area network (WAN).

FIG. 8 is a schematic diagram of the system 210, in which a remote computing device 250 remotely initiates the validation process of a firmware update of the IED 108. The remote computing device 250 may initiate the validation process automatically or upon input from an operator of the remote computing device 250. For example, the remote computing device 250 may initiate the validation process after receiving indication that a firmware update is complete, after an amount of time has elapsed since initiation of a firmware update, or as part of an automatic (e.g., periodic) maintenance process.

In an embodiment, the remote computing device 250 is configured to send a signal to the computing device 230 upon initiation of the validation process indicative of instructions to validate a firmware update of the IED 108 using selected simulated power delivery system measurements. In response, the computing device 230 sends the selected simulated power delivery system measurements 240 to the IED 108 via the switch 216. The IED 108 then generates and sends simulated digital measurements 242 to the computing device 230 via the switch 216, and the computing device validates the simulated digital measurements 242, as generally described by blocks 221, 222, 223, and 224 of the method 218. As described above, the simulated power delivery system measurements include digital data that may have similar qualities to that of the authentic digitized analog samples 214 sent by a merging unit 212, allowing the computing device 230, and thus the remote computing device 250, to initiate simulation of the authentic digitized analog samples 214 remotely. As such, the computing device 230 may act as an edge device (e.g., proxy device) for communications between the remote computing device 250 and, for example, the IED 108.

The selected simulated power delivery system measurements may be generated and/or selected, for example, based on an automatic process of the remote computing device 250 or input from an operator of the remote computing device 250, and may be selected based on the type of configuration changes including the firmware update. In an embodiment, the computing device 230 is configured to store multiple simulated power delivery system measurements in memory. As part of or in conjunction with remotely initiating firmware update validation, the remote computing device 250 may send a signal indicative of instructions to select simulated power delivery system measurements stored on the computing device 230 for the validation process.

If the firmware update is validated, the computing device 230 is configured to send a signal via WAN 252 to the remote computing device 250 indicative of the firmware update validation. In response to receiving the signal indicative of the firmware update validation, the remote computing device 250 may present a message 244 to the operator of the computing device 250 (e.g., via the display of the computing device 230,) confirming that the IED firmware update is validated.

If, however, the firmware update is invalidated, the computing device 230 is configured to send a signal via WAN 252 to the remote computing device 250 indicative of the firmware update invalidation. In response to receiving the signal indicative of firmware update invalidation, the remote computing device 250 may take remedial measures as described above and illustrated by the process block 224 of the method 218.

In another embodiment, in response to receiving the simulated digital measurements 242, the computing device 230 is configured to store the simulated digital measurements 242 in memory and subsequently forward the simulated digital measurements 242 via WAN 252 to the remote computing device 250. In response to receiving the test results 243, the remote computing device is configured to validate or invalidate the firmware update and take appropriate measures as described above.

The computing device 230 may store in memory a log of test results, event reports, or other measurements received over a period of time or firmware update validations processes. This log may be accessed and viewed by an operator of the computing device 230 via the display and/or UI. Further, the remote computing device 250 may query the computing device 230 for the log via the WAN 252. In response, the computing device 230 may transmit a signal over WAN 252 to the remote computing device 250 indicative of the log. In response, the remote computing device 250 may store the log in memory, such that it can be accessed by an operator of the remote computing device 250 via the display or UI. Thus, by retrieving the log, an operator of the remote computing device 250 may remotely view information indicating the behavior of the IED(s) communicatively connected to the computing device 230. This allows, for example, a regulatory audit of the electric power delivery system to be conducted without the need for an operator to be physically present at the electric power delivery system.

In an embodiment, the WAN 252 communicatively couples the remote computing device 250 and multiple computing devices 230. In some embodiments, the multiple computing devices 230 may be deployed as part of, or in conjunction with, multiple electric power delivery systems. A remote computing device 250 may thus initiate and validate firmware updates of one or more IEDs 108 via the multiple computing devices 230 and the WAN 252. Thus, via the remote computing device 250, an operator may remotely push a firmware update to a large number of IEDs 108. Likewise, the remote computing device 250 may query the one or more computing device(s) 230 for a log of event reports, test results, and so on, of the multiple IEDs 108 fulfill, for example, a provider-wide or system-wide regulatory audit. In an embodiment, after pushing a firmware update to multiple IEDs 108, upon determination of an invalid firmware update for one or more IEDs 108, remedial measures may be taken for all IEDs 108 that received the firmware update. In other words, if a problem with a firmware update is detected at one IED 108, the firmware update may be restarted, rolled back, reset, or otherwise remedied across all IEDs 108 that received the update.

While specific embodiments and applications of the disclosure have been illustrated and described, it is to be noted that the disclosure is not limited to the precise configurations and devices disclosed herein. Accordingly, many changes may be made to the details of the above-described embodiments without departing from the underlying principles of this disclosure. The scope of the present disclosure should, therefore, be determined only by the following claims.

Indeed, the embodiments set forth in the present disclosure may be susceptible to various modifications and alternative forms, specific embodiments have been shown by way of example in the drawings and have been described in detail herein. However, it may be noted that the disclosure is not intended to be limited to the particular forms disclosed. The disclosure is to cover all modifications, equivalents, and alternatives falling within the spirit and scope of the disclosure as defined by the following appended claims. In addition, the techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). For any claims containing elements designated in any other manner, however, it is intended that such elements are not to be interpreted under 35 U.S.C. 112(f).

What is claimed is:

1. A system, comprising:
a computing device configured to communicatively couple to an intelligent electronic device (IED) of an electric power delivery system, wherein the computing device is configured to:
    transmit a signal, to the intelligent electronic device (IED) during normal intelligent electronic device (IED) operation in which the intelligent electronic device (IED) is configured to control one or more components of the electric power delivery system, comprising instructions to cause the intelligent electronic device (IED) to:
        pause the normal intelligent electronic device (IED) operation and stop controlling the one or more components of the electric power delivery system; and
        apply a firmware update;
    transmit a signal comprising simulated digitized analog power delivery system samples to the intelligent electronic device (IED);
    receive a signal indicative of simulated digital measurements generated by the intelligent electronic device (IED) based on the simulated digitized analog power delivery system samples;
    determine validation of the firmware update based on the simulated digital measurements; and
    based on the determination of validation of the firmware indicating that the firmware is not validated, transmit a signal comprising instructions to cause the intelligent electronic device (IED) to restart the application of the firmware update or revert to a prior firmware configuration.

2. The system of claim 1, wherein the computing device is configured to determine validation of the firmware based on a comparison of the simulated digital measurements and expected digital measurements.

3. The system of claim 2, wherein the computing device is configured to determine that the firmware is validated when the simulated digital measurements fall within a threshold of the expected digital measurements.

4. The system of claim 1, wherein the computing device is configured to send the firmware update to the intelligent electronic device (IED) before transmitting the signal indicative of instructions to pause normal intelligent electronic device (IED) operation and apply the firmware update.

5. The system of claim 1, wherein the computing device is communicatively coupled to the intelligent electronic device (IED) via a switch.

6. The system of claim 5, wherein the switch is configured to transfer authentic digitized analog samples of the electric power delivery system during normal intelligent electronic device (IED) operation and not to transfer the authentic digitized analog samples of the electric power delivery system when normal intelligent electronic device (IED) operation is paused.

7. The system of claim 1, wherein the computing device is configured to, based on the determination of validation of the firmware indicating that the firmware is not validated, transmit a signal comprising a command to another intelligent electronic device (IED) to change primary, dual primary, or backup protection status.

8. The system of claim 1, wherein the intelligent electronic device (IED) is configured to download the firmware update from a source other than the computing device.

9. The system of claim 1, wherein the computing device is configured to, based on the determination of validation of the firmware indicating that the firmware is not validated, transmit a message to an operator that the firmware is not validated.

10. The system of claim 1, wherein:
the computing device comprises a remote computing device;
the system comprises a local computing device in communication with the intelligent electronic device (IED); and
the remote computing device is configured to communicatively couple, via a wide area network, to the local computing device in communication with the intelligent electronic device (IED) to enable the remote computing device to communicatively couple to the intelligent electronic device (IED).

11. A non-transitory computer-readable medium comprising computer-executable instructions that, when executed, are configured to cause data processing circuitry to perform operations comprising:
issuing, to a first intelligent electronic device (IED) during normal intelligent electronic device (IED) operation in which the first intelligent electronic device (IED) is configured to control one or more components of an electric power delivery system, one or more commands to:
    pause normal intelligent electronic device (IED) operation and stop controlling the one or more components of the electric power delivery system; and
    apply a firmware update;
providing simulated digitized analog power delivery system samples to the first intelligent electronic device (IED);
receiving simulated digital measurements from the first intelligent electronic device (IED) responsive to the simulated digitized analog power delivery system samples;
determining validation of the firmware update based on the simulated digital measurements; and
based on the determination of validation of the firmware indicating that the firmware is not validated, issuing one or more commands to cause a second intelligent electronic device (IED) to change primary, dual primary, or backup protection status.

12. The computer-readable medium of claim 11, wherein the simulated digital measurements comprise a log of event reports generated in response to the simulated digitized analog power delivery system samples.

13. The computer-readable medium of claim 11, comprising instructions that, when executed, are configured to cause the data processing circuitry to perform operations comprising:

provide the firmware update to the intelligent electronic device (IED).

14. The computer-readable medium of claim 11, comprising instructions that, when executed, are configured to cause the data processing circuitry to perform operations comprising:

issuing one or more commands to the intelligent electronic device (IED) to download the firmware update.

15. The computer-readable medium of claim 11, comprising instructions that, when executed, are configured to cause the data processing circuitry to perform operations comprising:

connecting, via a wide area network, to a local computing system; and prompting the local computing system to perform the operations recited in claim 11.

16. The computer-readable medium of claim 11, comprising instructions that, when executed, are configured to cause the data processing circuitry to perform operations comprising:

connecting, via a wide area network, to a local computing system; and performing the operations recited in claim 11 using the local computing system as an edge device.

17. A method, comprising:

instructing, via a computing device, an intelligent electronic device (IED) of a power delivery system during normal intelligent electronic device (IED) operation in which the intelligent electronic device (IED) is configured to control one or more components of the electric power delivery system, to:

pause normal operation and stop controlling the one or more components of the electric power delivery system; and apply a firmware update;

providing, via the computing device, simulated digitized analog power delivery system samples to the intelligent electronic device (IED);

receiving, via the computing device, simulated digital measurements indicative of intelligent electronic device (IED) behavior in response to the simulated digitized analog power delivery system samples;

determining, via the computing device, validation of the firmware update based on the simulated digital measurements; and based on the determination of validation of the firmware indicating that the firmware is not validated:

instructing the intelligent electronic device (IED) to restart the application of the firmware update or revert to a prior firmware configuration; or instructing one or more additional intelligent electronic devices (IEDs) to change primary, dual primary, or backup protection status; or a combination thereof.

18. The method of claim 17, wherein the firmware update comprises security configuration changes, control changes, measurement changes, or any combination thereof.

19. The method of claim 17, wherein the method is performed by a testing device within a local area network of the intelligent electronic device (IED), and wherein the intelligent electronic device (IED) comprises an intelligent merging unit.

20. The method of claim 19, comprising:

receiving a test file from a computing device separated from the intelligent merging unit, wherein the test file comprises instructions readable by the testing device; and generating the simulated digitized analog power delivery system samples based on the instructions.

* * * * *